(12) United States Patent
Lee et al.

(10) Patent No.: US 9,320,043 B2
(45) Date of Patent: Apr. 19, 2016

(54) METHOD FOR CONTROLLING INTERFERENCE IN AN OVERLAID NETWORK ENVIRONMENT

(75) Inventors: Hee Soo Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 166 days.

(21) Appl. No.: 13/884,236

(22) PCT Filed: Nov. 8, 2011

(86) PCT No.: PCT/KR2011/008460
§ 371 (c)(1),
(2), (4) Date: May 8, 2013

(87) PCT Pub. No.: WO2012/064080
PCT Pub. Date: May 18, 2012

(65) Prior Publication Data
US 2013/0229972 A1  Sep. 5, 2013

(30) Foreign Application Priority Data

Nov. 8, 2010 (KR) .................. 10-2010-0110648
Nov. 11, 2010 (KR) .................. 10-2010-0112280

(51) Int. Cl.
*H04W 4/00* (2009.01)
*H04W 72/08* (2009.01)
(Continued)

(52) U.S. Cl.
CPC ........... *H04W 72/082* (2013.01); *H04J 11/005* (2013.01); *H04L 5/0044* (2013.01);
(Continued)

(58) Field of Classification Search
CPC .. H04W 72/082; H04J 11/005; H04L 5/0073; H04L 5/0044
USPC .......................... 370/252–254, 328–329, 311
See application file for complete search history.

(56) References Cited

U.S. PATENT DOCUMENTS 8,559,374 B2 * 10/2013 Koo et al. .................. 370/328
2009/0147735 A1 * 6/2009 Ghosh et al. .................. 370/329
(Continued)

FOREIGN PATENT DOCUMENTS

KR  10-2004-0067623   7/2004
WO     2012/064080 A2   5/2012

OTHER PUBLICATIONS

U.S. Appl. No. 61/390,533, filed Oct. 6, 2010.*
(Continued)

*Primary Examiner* — Chuong T Ho
(74) *Attorney, Agent, or Firm* — Nelson Mullins Riley & Scarborough LLP

(57) ABSTRACT

Disclosed is a method for controlling interference in a heterogeneous network environment. The method for controlling the inter-cell interference of a base station according to one aspect of the present invention comprises the following steps: transmitting, to a terminal, information relating to subframes in which a portion of a resource is to be punctured; transmitting, to the terminal, a relevant subframe in which a portion of a resource is punctured on the basis of the information relating to said subframes. A method for controlling the inter-cell interference of a base station according to another aspect of the present invention comprises the following steps: setting a resource for transmitting system information; and transmitting system information using only said resource for transmitting system information, or preferentially using said resource for transmitting system information when transmitting system information using a subframe designated as an almost blank subframe (ABS). Accordingly, inter-cell interference problems may be alleviated even in the event pieces of important system information, such as CRS, should be transmitted using an ABS.

13 Claims, 6 Drawing Sheets

(51) Int. Cl.
 *H04J 11/00* (2006.01)
 *H04W 48/10* (2009.01)
 *H04W 84/04* (2009.01)
 *H04L 5/00* (2006.01)

(52) U.S. Cl.
 CPC ......... *H04L5/0073* (2013.01); *H04J 2211/001* (2013.01); *H04L 5/0007* (2013.01); *H04L 5/0096* (2013.01); *H04W 48/10* (2013.01); *H04W 84/045* (2013.01)

(56) References Cited

U.S. PATENT DOCUMENTS

| | | | | |
|---|---|---|---|---|
| 2010/0056165 | A1* | 3/2010 | Kim et al. | 455/450 |
| 2010/0232373 | A1* | 9/2010 | Nory et al. | 370/329 |
| 2011/0252139 | A1* | 10/2011 | Bhattad et al. | 709/226 |
| 2011/0255431 | A1* | 10/2011 | Wang et al. | 370/252 |
| 2011/0305223 | A1* | 12/2011 | Koo et al. | 370/335 |
| 2011/0310830 | A1* | 12/2011 | Wu et al. | 370/329 |
| 2011/0317641 | A1* | 12/2011 | Noh et al. | 370/329 |
| 2011/0319025 | A1* | 12/2011 | Siomina et al. | 455/63.1 |
| 2012/0082079 | A1* | 4/2012 | Luo et al. | 370/311 |
| 2012/0087261 | A1* | 4/2012 | Yoo et al. | 370/252 |
| 2012/0113816 | A1* | 5/2012 | Bhattad et al. | 370/246 |
| 2012/0113961 | A1* | 5/2012 | Krishnamurthy | 370/332 |
| 2013/0033998 | A1* | 2/2013 | Seo et al. | 370/252 |
| 2013/0176981 | A1* | 7/2013 | Earnshaw | H04L 1/02 370/329 |
| 2013/0301456 | A1* | 11/2013 | Siomina et al. | 370/252 |

OTHER PUBLICATIONS

International Search Report and Written Opinion for Application No. PCT/KR2011/008460, 9 pages, dated May 18, 2012.

* cited by examiner

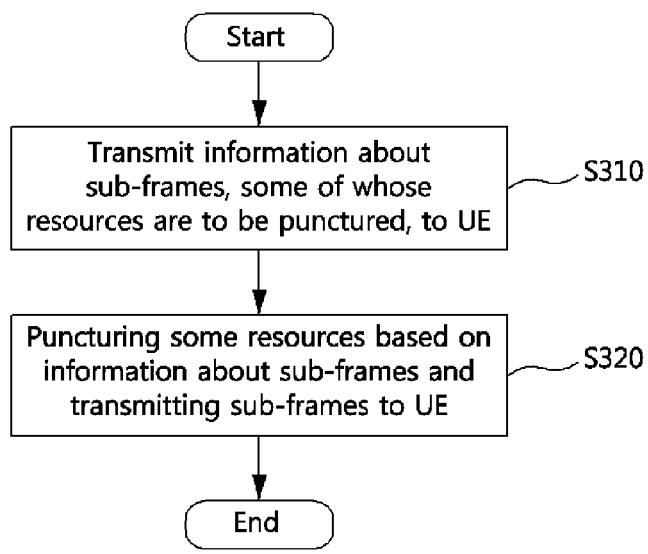

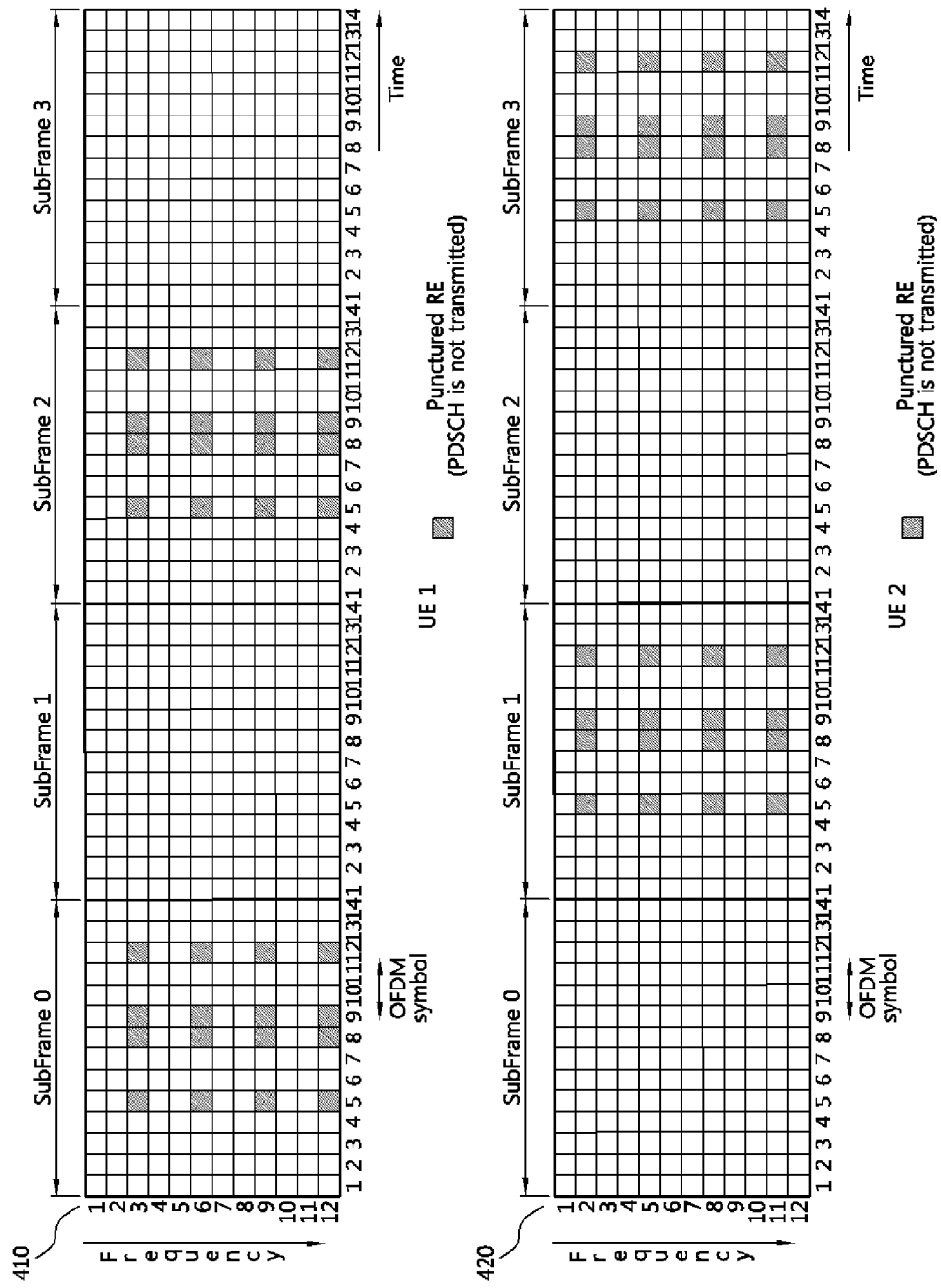

METHOD FOR CONTROLLING INTERFERENCE IN AN OVERLAID NETWORK ENVIRONMENT

RELATED APPLICATIONS

This application is a 35 U.S.C. §371 filing of International Application Number PCT/KR2011/008460 which was filed on Nov. 8, 2011, and which claims priority to, and the benefit of, Korean Application Nos. 10-2010-0110648, filed on Nov. 8, 2010, and 10-2010-0112280, filed on Nov. 11, 2010. The contents of the aforementioned applications are hereby incorporated herein by reference.

TECHNICAL FIELD

Example embodiments of the present invention relate in general to an inter-cell interference control method in a heterogeneous network environment, and more specifically, to operation methods of a base station and a terminal, which are capable of mitigating inter-cell interference caused by transmission of important system information when an almost blank sub-frame (ABS) is used for a time-domain inter-cell interference control technique.

BACKGROUND ART

A heterogeneous network environment refers to an environment in which the cell coverage of a base station whose transmission power is high (a high power node) overlaps the cell coverage of a base station whose transmission power is low (a low power node).

In the heterogeneous network environment, inter-cell interference (ICI) that occurs between overlapping cells is one of the most important problems. Techniques of avoiding or mitigating inter-cell interference are referred to as inter-cell interference control (ICIC).

One general ICIC technique is a time-domain ICIC technique in which adjacent cells transmit signals using different resources in the time domain.

In particular, in the representative time-domain ICIC technique, a sub-frame (an almost blank sub-frame (ABS)) which does not transmit a physical downlink shared channel (PDSCH) is for each base station, and transmission to terminals in an adjacent cell in a section of the sub-frame designated as the ABS is scheduled to minimize interference.

However, the base station cannot help transmitting important system information (SI) such as a cell-specific reference signal (CRS) or a synchronization signal (SS) through the sub-frame designated as the ABS. Thus, inter-cell interference caused by the SI is still problematic.

DISCLOSURE

Technical Problem

Example embodiments of the present invention provide an inter-cell interference control (ICIC) method of a base station, which is capable of mitigating inter-cell interference caused by transmission of system information (SI) when an almost blank sub-frame (ABS), which is one of time-domain ICIC techniques, is used in a heterogeneous network environment.

Example embodiments of the present invention also provides an ICIC method of a terminal, which is capable of mitigating inter-cell interference caused by transmission of SI when an ABS, which is one of time-domain ICIC techniques, is used in a heterogeneous network environment.

Technical Solution

In some example embodiments, a time-domain ICIC method of a base station in a heterogeneous network environment includes: transmitting information about sub-frames, some of whose resources are to be punctured, to user equipment (UE); and puncturing the some resources of the corresponding sub-frame based on the information about the sub-frames and transmitting the sub-frame, some of whose resources are punctured, to the UE.

The some resources may include resources through which the base station transmits a cell-specific reference signal (CRS).

The information about the sub-frames may further include information about some resources to be punctured in the sub-frame.

The sub-frames, some of whose resources are punctured, may be set to be specific to a cell managed by the base station or may be set to be specific to the UE. When the sub-frames, some of whose resources are punctured, are set to be specific to the cell managed by the base station, the information about the sub-frames may be transmitted to the UE using SI broadcast by the base station. When the sub-frames, some of whose resources are punctured, are set to be specific to the UE, the information about the sub-frames may be transmitted to the UE using radio resource control (RRC) signaling from the base station to the UE or a physical downlink control channel (PDCCH) for the UE.

In other example embodiments, a time-domain ICIC method of a base station in a heterogeneous network environment includes: setting system information (SI) transmission resources; and transmitting SI using only the SI transmission resources or preferentially using the SI transmission resources when SI is transmitted using a sub-frame designated as an almost blank sub-frame (ABS).

The SI transmission resources may be used to transmit at least one of a CRS, a primary synchronization signal (PSS), a secondary synchronization signal (SSS), a physical broadcast channel (PBCH), a SI block (SIB1), and a paging message.

The SI transmission resources may include at least one of a time, a frequency, a code, and a sequence.

In setting the SI transmission resources, the base station directly may set its SI transmission resources or be configured to receive the setting from an operation & management (O&M) server.

The time-domain ICIC method may further include informing, at the base station, the SI transmission resources set in setting the SI transmission resources directly to an adjacent cell or to an adjacent cell through an operation & management (O&M) server or a mobility management entity (MME).

In still other example embodiments, a time-domain ICIC method of UE in a heterogeneous network environment includes receiving information about sub-frames, some of whose resources are to be punctured; and receiving data using a region excluding the resources to be punctured in a corresponding sub-frame based on the information about the sub-frames.

Advantageous Effects

Using an ICIC method according to the present invention, it is possible to mitigate inter-cell interference caused by transmission of important SI such as a CRS even when a time-domain ICIC technique using an ABS sub-frame is used for ICIC in a heterogeneous network environment.

BRIEF DESCRIPTION OF DRAWINGS

FIG. 2 is a conceptual diagram for explaining examples of sub-frames transmitted when time-domain interference control is applied;

FIG. 3 is a flowchart for explaining an example of an inter-cell interference control (ICIC) method of a base station according to an embodiment of the present invention.

FIG. 4 is a frame structure diagram for explaining an example in which a UE-specific sub-frame is punctured;

MODE FOR EMBODYING INVENTION

Figure 1:
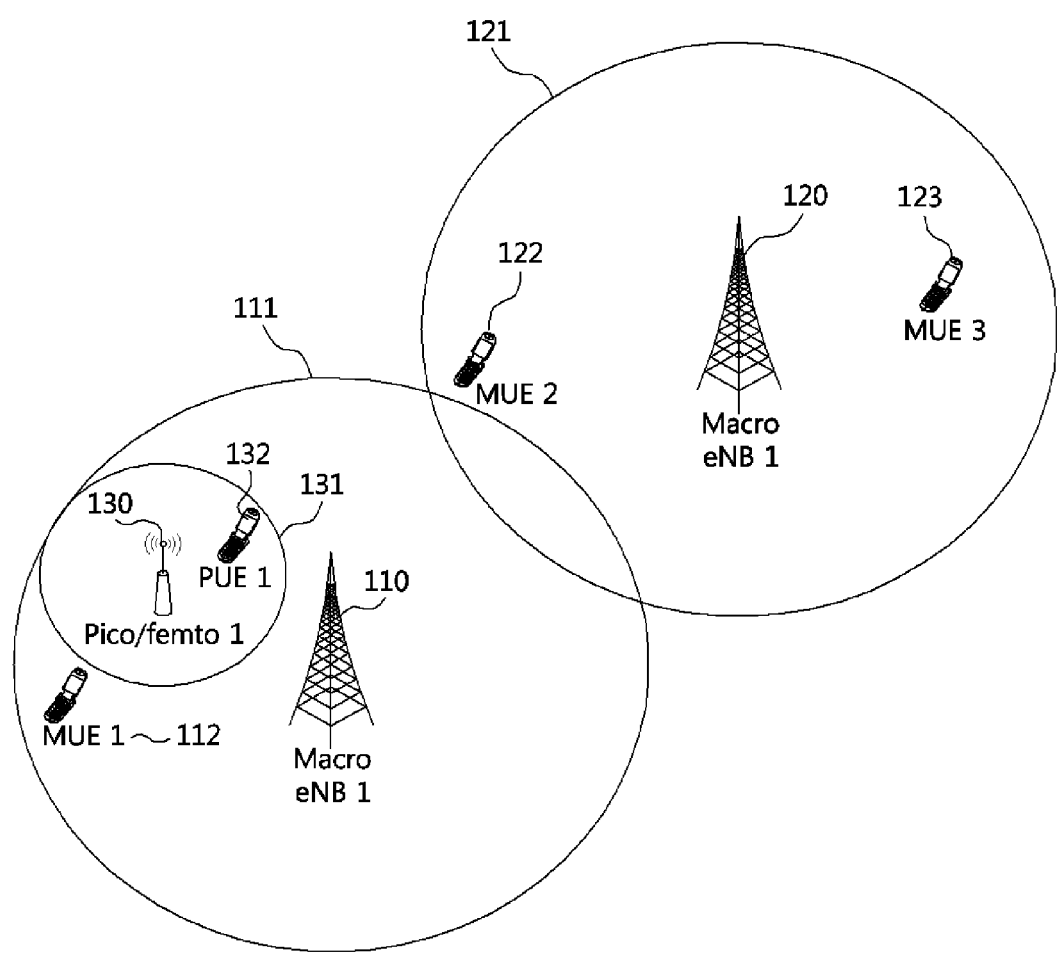
FIG. 1 is a conceptual diagram illustrating an example of a heterogeneous network environment.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

A term "terminal" used herein may be referred to as a mobile station (MS), user equipment (UE), a user terminal (UT), a wireless terminal, access terminal (AT), a subscriber unit, a subscriber station (SS), a wireless device, a wireless communication device, a wireless transmit/receive unit (WTRU), a moving node, a relay node (RN), a machine type communication (MTC) device, or other terms. Various example embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

A term "base station" used herein generally denotes a fixed or moving point communicating with a terminal, and may be referred to as a Node-B, an evolved Node-B (eNB), a base transceiver system (BTS), an access point (AP), a relay, a femto-cell, or other terms. The "base station" used herein denotes a control device that controls one cell. A "physical base station" in an actual communication system can control a plurality of cells, and in this case, a "physical base station" may be considered as including a plurality of "base stations" used herein. That is, a "base station" may be considered to allocate different values as parameters differently allocated to cells.

A term "system information" used herein in a narrow sense generally denotes system information (SI) broadcast from a base station, and in a broad sense denotes information related to management of a mobile communication system such as a reference signal, a synchronization signal, and a paging message transmitted from a base station.

Hereinafter, example embodiments of the present invention will be described in detail with reference to the accompanying drawings. To help with understanding with the disclosure, in the drawings, like reference numerals denote like parts, and the redundant description on like parts will not be repeated.

In a heterogeneous network environment, a base station having high transmission power (a high power node) and a base station having low transmission power (a low power node) are present together.

FIG. 1 is a conceptual diagram illustrating an example of a heterogeneous network environment.

Referring to FIG. 1, two macro eNBs 110 and 120 are present, and the eNBs 110 and 120 include macro cells 111 and 121, respectively.

UE 1 112 is macro UE (MUE) that receives service from the macro eNB 1 110 (that is, the macro cell 1 111 functions as a serving cell), and UE 2 122 and UE 3 123 are MUEs that receive service from the macro eNB 2 120 (that is, the macro cell 2 121 functions as a serving cell). A pico eNB 130 having a cell coverage 131 overlapping the macro cell 1 111 is present. UE 4 132 is pico UE (PUE) that receives service from the pico eNB 130 (that is, the pico cell 131 functions as a serving cell).

Generally, the UE is connected to a cell whose downlink received signal strength is strong to receive service. However, in a heterogeneous network environment, when the UE is connected to a cell that is weak in the downlink received signal strength but small in a path loss to receive a service, the performance of the whole system is improved. A technique of enabling the UE to be connected to a cell that is weak in the downlink received signal strength but small in a path loss and thus substantially increasing the coverage of a pico eNB is referred to as cell range expansion (CRE).

However, the use of CRE causes a problem (that is, inter-cell interference) in that UE (for example, the UE 4 132) in a cell edge region of the pico eNB does not receive proper data due to an interference signal from the macro cell which is stronger in strength than a receiving signal from the pico eNB that provides service to itself.

In order to solve the interference problem, time-domain inter-cell interference control (ICIC) techniques have been considered and used. For example, a macro eNB near which a pico eNB is present classifies sub-frames to transmit into sub-frames in which a UE-specific PDSCH is transmitted and sub-frames in which a UE-specific PDSCH is not transmitted. That is, the macro eNB classifies sub-frames to transmit into sub-frames that transmit the PDSCH to UEs belonging to itself, and sub-frames transmitted with blank regions without transmitting the PDSCH so as not to give interference to adjacent cells.

FIG. 2 is a conceptual diagram for explaining examples of sub-frames transmitted when the time-domain ICIC is applied.

Referring to FIG. 2, a macro eNB 1 defines some of sub-frames as sub-frames that do not transmit the UE-specific PDSCH and performs a transmission operation (210). At this time, the sub-frame that does not transmit the UE-specific PDSCH may be defined as an almost blank sub-frame (ABS).

Thus, when a pico eNB (for example, 130 in FIG. 1) transmits data to UE (for example, the UE 4 in FIG. 1) in a cell edge region using the sub-frame which a macro eNB (for example, 110 in FIG. 1) designated as the ABS, interference from the macro eNB is small, and thus transmission and reception of data can be efficiently performed.

Meanwhile, since the UE-specific PDSCH is not transmitted to the UE through the ABS, a physical downlink control channel (PDCCH) necessary for PDSCH transmission is not transmitted through the ABS. However, the CRS is transmitted through the ABS. Since resources through which the CRS is transmitted may overlap resources through which the PDSCH is transmitted, it is difficult to avoid interference caused by the CRS of the macro eNB even when the pico eNB transmits data to the UE in the cell edge region using the sub-frame which the macro eNB designated as the ABS.

In order to further reduce the interference caused by the CRS, an eNB punctures some resource elements in a physical resource block (PRB) used for transmission of the PDSCH before transmission. That is, the inference can be avoided such that resources through which an adjacent eNB transmits the CRS are punctured, and PDSCH data is not transmitted through the punctured resources.

However, when some of resources of sub-frames allocated for transmission of the UE-specific PDSCH are punctured, and PDSCH data is not transmitted through the punctured resources so as to reduce influence of interference from an adjacent cell, the UE that receives the PDSCH data can properly decode data only when the UE has information about the resources punctured by the eNB.

In this regard, the present invention suggests a method of configuring resources to be punctured by the eNB and an operation method of the eNB that signals the information about resources to be punctured to the UE. Further, the present invention suggests an operation method of the UE that receives the information about resources punctured by the eNB and decodes the PDSCH data.

ICIC Method of eNB According to Present Invention

FIG. 3 is a flowchart for explaining an example of an ICIC method of an eNB according to an embodiment of the present invention.

Referring to FIG. 3, an ICIC method of an eNB according to an embodiment of the present invention may include step S310 of transmitting information about sub-frames, some of whose resources are to be punctured, to UE, and step S320 of puncturing the some resources of the sub-frames based on the information about the sub-frames and then transmitting the sub-frames to the UE.

In the present invention, when some resources allocated for transmission of the UE-specific PDSCH are punctured and the PDSCH data is not transmitted through the punctured resources, the eNB may be configured to decide whether or not puncturing is to be applied depending on each sub-frame. That is, in a certain sub-frame, some resources allocated for PDSCH transmission are punctured, and the PDSCH data is not transmitted through the punctured resources, whereas in another sub-frame, puncturing is not performed, and the UE-specific PDSCH data is transmitted using all resources allocated for PDSCH transmission.

In step S310, the information about the sub-frame, some of whose resources are punctured, is transmitted to the UE, and the UE is informed of the sub-frame which is transmitted with the punctured resources.

In the present invention, when it is decided for each sub-frame whether or not puncturing is to be applied, the sub-frame to which puncturing is applied may be set to be specific to UE or to be specific to a cell. When the sub-frame is set to be specific to the UE, a sub-frame to which puncturing is applied is set for each UE. When the sub-frame is set to be specific to the cell, a sub-frame to which puncturing is applied is set in common for all UEs belonging to a cell. Of course, a method of setting a sub-frame to be specific to a cell may be combined with a method of setting a sub-frame to be specific to UE.

First, an example of setting sub-frames to be specific to UE will be described.

FIG. 4 is a frame structure diagram for explaining an example in which a UE-specific sub-frame is punctured.

Referring to FIG. 4, for UE 1, some resources of a sub-frame 0 and a sub-frame 2 are punctured, and a sub-frame 1 and a sub-frame 3 are not punctured (410). However, for UE 2, some resources of a sub-frame 1 and a sub-frame 3 are punctured, and a sub-frame 0 and a sub-frame 2 are not punctured (420).

That is, when a sub-frame to which puncturing is applied is set to be specific to UE, the UE-specific PDSCH is transmitted to a plurality of UEs through a single sub-frame, however, puncturing may be performed for a certain UE, or puncturing may not be performed for another UE.

Thus, a method of setting a sub-frame to which puncturing is applied for each UE according to the present invention may include at least one of the following special cases:

1) For a certain UE, puncturing is not applied to any sub-frames; and

2) For a certain UE, puncturing is applied to all sub-frames.

Further, in a method of setting a sub-frame to which puncturing is applied for each UE according to the present invention, as a more special example, all UEs should belong to one of the following two groups:

1) A group in which puncturing is performed in all sub-frames; and

2) A group in which puncturing is not performed in any sub-frames.

Further, in the ICIC method according to the present invention, the eNB may specifically set resources to puncture for each UE. That is, in a sub-frame to which puncturing is applied, resources to puncture are differently set for each UE. Referring back to FIG. 4, it can be understood that a location of resources to puncture in a sub-frame to which puncturing is applied is differently set for each UE. For example, locations (time-frequency) of resources to puncture in the sub-frames 0 and 2 for the UE 1 are set to be different from locations of resources to puncture in the sub-frames 1 and 3 for the UE 2.

In the present invention, when sub-frames to which puncturing is applied or resources to puncture are configured to be specific to the UE, information about sub-frames to which puncturing is applied or resources to puncture may be informed through radio resource control (RRC) signaling.

Next, an example in which a method of setting a sub-frame to be specific to a cell is combined with a method of setting a sub-frame to be specific to UE will be described.

In the present invention, a method of setting a sub-frame to be specific to a cell may be used in combination with a method of setting a sub-frame to be specific to UE. That is, in a sub-frame, to which puncturing is applied, configured to be specific to a cell, puncturing is applied to all UE. Thus, a set of sub-frames to which puncturing is applied for a certain UE may be a union of a set of sub-frames, to which puncturing is applied, to be specific to a cell and a set of sub-frames, to which puncturing is applied, configured to be specific to UE for the UE.

In a sub-frame, to which puncturing is applied, set to be specific to a cell, resources to puncture may be set to be specific to a cell. At this time, information about a sub-frame, to which puncturing is applied, set to be specific to a cell or resources to puncture in the sub-frame may be broadcast to all UEs as SI.

As a method of informing the information about the sub-frame to which puncturing is applied from the eNB to the UE, a method in which semi-static setting is combined with dynamic setting may be used. For example, semi-static setting may be performed through RRC signaling, and dynamic setting may be performed using the PDCCH for the UE. For example, at the time of PDCCH transmission for the UE-specific PDSCH, information as to whether or not puncturing is applied to the PDSCH to transmit may be included in a message of the PDCCH and then transmitted.

Referring back to FIG. 3, in step S320, the some resources of the sub-frames are punctured based on the information about the sub-frames transmitted to the UE, and then the sub-frames are transmitted to the UE.

Meanwhile, a single sub-frame may be configured such that a PDSCH region in which user data is included is punctured, while a PDSCH region in which the following information is included is not punctured.

1) SI: a CRS, a primary synchronization signal (PSS), a secondary synchronization signal (SSS), a physical broadcast channel (PBCH), a SI block (SIB1), and the like.

2) Paging message.

As described above, the ABS is used to reduce interference influencing a victim UE in an adjacent cell. That is, when an aggressor cell designates a certain sub-frame as the ABS and does not transmit the UE-specific PDSCH through the ABS, influence of interference on the victim UE in the adjacent cell is reduced, and thus the victim UE in the adjacent cell can efficiently perform transmission and reception of data.

However, even if the aggressor cell does not transmit the UE-specific PDSCH through the designated sub-frame, the aggressor cell has to transmit an important signal or information such as the CRS, the PSS, the SSS, the PBCH, the SIB1, and the paging message. Thus, for the sub-frame which the aggressor cell designated as the ABS, there still remains a problem that interference will be caused by transmission of the CRS, the PSS, the SSS, the PBCH, the SIB1, or the paging message from the aggressor cell.

In this regard, the present invention provides a method of solving influence of interference, on the victim UE, which is caused by transmission of the SI, the paging message, or the like through the sub-frame which the aggressor cell designated as the ABS.

Figure 5:
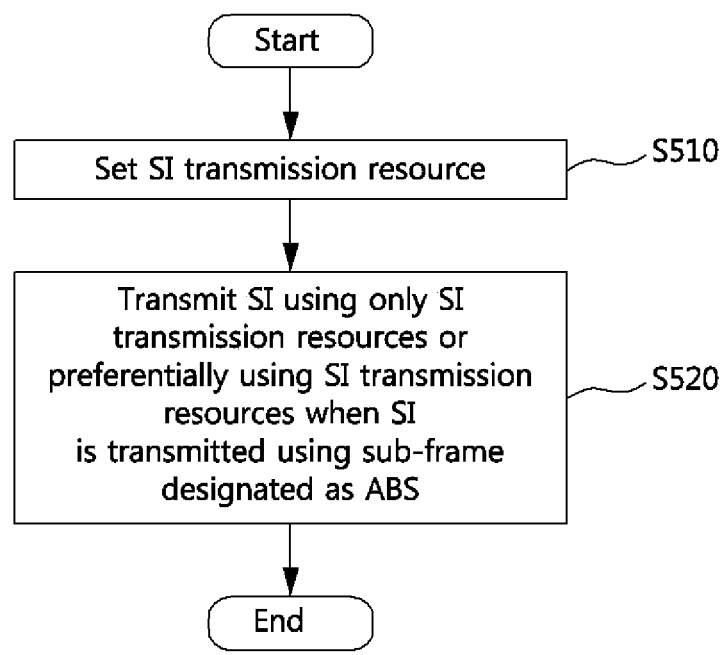
FIG. 5 is a flowchart for explaining an ICIC method of a base station according to another embodiment of the present invention.

FIG. 5 is a flowchart for explaining an ICIC method of a base station according to another embodiment of the present invention.

Referring to FIG. 5, an ICIC method of a base station according to another embodiment of the present invention may include step S510 of setting an SI transmission resource, and step S520 of transmitting SI using only the SI transmission resources or preferentially using the SI transmission resources when the SI is transmitted using a sub-frame designated as an ABS.

In the another example of the ICIC method illustrated in FIG. 5, in order to solve the problem of interference caused by the SI when the SI or the paging message is transmitted through the sub-frame which the aggressor cell designated as the ABS, use of resources is restricted so that transmission can be performed using only designated resources (hereinafter referred to as "SI transmission resource") or preferentially using the designated resources. Here, examples of the resources include a frequency, a time, a code, and a sequence.

In step S510, the SI transmission resources are decided. The process of step S510 will be described in detail with reference to FIG. 6.

Figure 6:
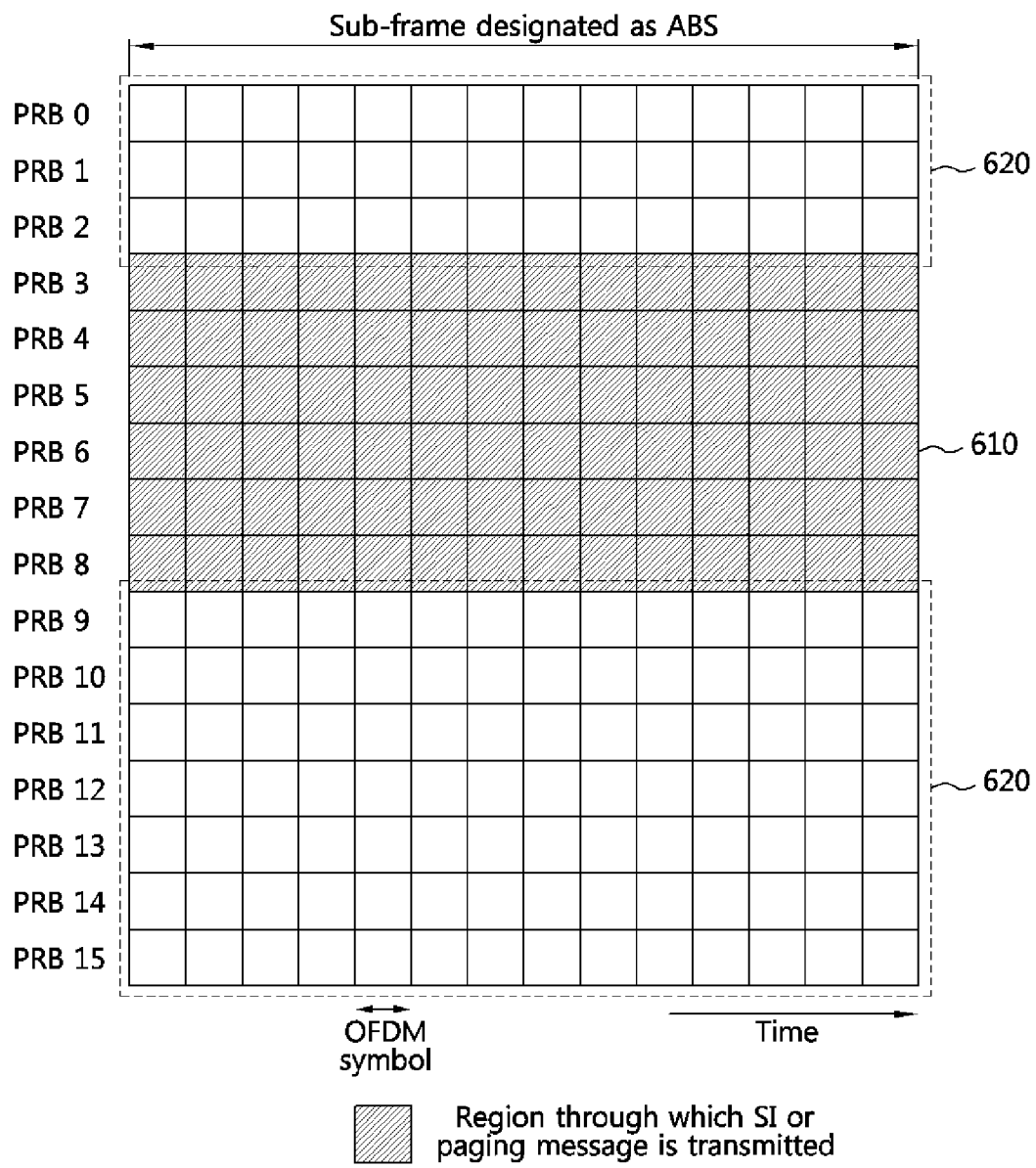
FIG. 6 is a resource structure diagram of a sub-frame designated as an ABS in an ICIC method of a base station according to another embodiment of the present invention.

FIG. 6 is a resource structure diagram of a sub-frame designated as an ABS in the ICIC method of the base station according to another embodiment of the present invention.

FIG. 6 shows an example of a structure of a sub-frame which an aggressor cell designated as an ABS. Hatched PRBs 610 are regions which are allowed to transmit the SI such as the SIB1 or the paging message in the sub-frame designated as the ABS. In the sub-frame designated as the ASB, a non-patched PRB 620 is not used to transmit the SI such as the SIB1 or the paging message.

In the example of FIG. 6, 16 PRBs are present at a frequency axis, and the SI such as the SIB1 or the paging message is transmitted using only the resources of PRBs 3 to 8. That is, FIG. 6 shows an example in which the SI transmission resources are restricted using time and frequency resources. However, the SI transmission resources may be restricted using code and sequence resources.

In the present invention, the following methods may be used as a method of setting the SI transmission resources allowed to transmit the SI such as the SIB1 or the paging message in the sub-frame designated as the ABS.

In a first method, all cells set the same SI transmission resources.

In a second method, the SI transmission resources are set to be specific to a cell. In this case, each cell can set its SI transmission resources by itself, or the SI transmission resources set by an operation & management (O&M) server may be informed. When the SI transmission resources are set to be specific to a cell, each cell may inform an adjacent cell of its SI transmission resources, or a network component such as an O&M server or a mobility management entity (MME) may inform an adjacent cell of the SI transmission resources of each cell.

The fact that the aggressor cell can transmit the SI such as the SIB1 or the paging message using only the designated resources in the sub-frame which the aggressor cell designated as the ABS can be used by a cell in which the victim UE is present as follows.

The cell in which the victim UE is present (a serving cell of the victim UE) can notice the resources that are influenced by interference caused by the SI or the paging message transmitted through the sub-frame which the aggressor cell designated as the ABS. Thus, the cell in which the victim UE is present can schedule PDSCH transmission not to use the resources and then transmit the PDSCH to the victim UE.

As described above, in the present invention, the aggressor cell transmits the SI such as the SIB1 or the paging message using only the designated or allowed resources in its ABS and does not transmit the SI such as the SIB1 or the paging message using other resources. However, since it is difficult to accurately estimate the amount of the SI such as the SIB1 or the paging message, it is difficult to appropriately set the amount of allowed resources (SI transmission resources) in advance.

Thus, in the ICIC method according to another embodiment of the present invention, the aggressor cell transmits the SI such as the SIB1 or the paging message by preferentially using resources of a previously set region in its ABS, and when the amount of the SI such as the SIB1 or the paging message exceeds the amount of the previously set resources, the SI such as the SIB1 or the paging message may not be transmitted using resources other than the previously set resources.

That is, the aggressor cell sets a region of preferentially used resources for transmission of the SI such as the SIB1 or the paging message in the ABS.

In the present invention, as a method of setting the SI transmission resources for preferentially transmitting the SI such as the SIB1 or the paging message in the sub-frame designated as the ABS, the same method as the method of setting the SI transmission resources described above (a method of setting the same SI transmission resources for all cells or a method of setting the SI transmission resources to be specific to a cell) may be used.

ICIC Method of UE According to Present Invention

Figure 7:
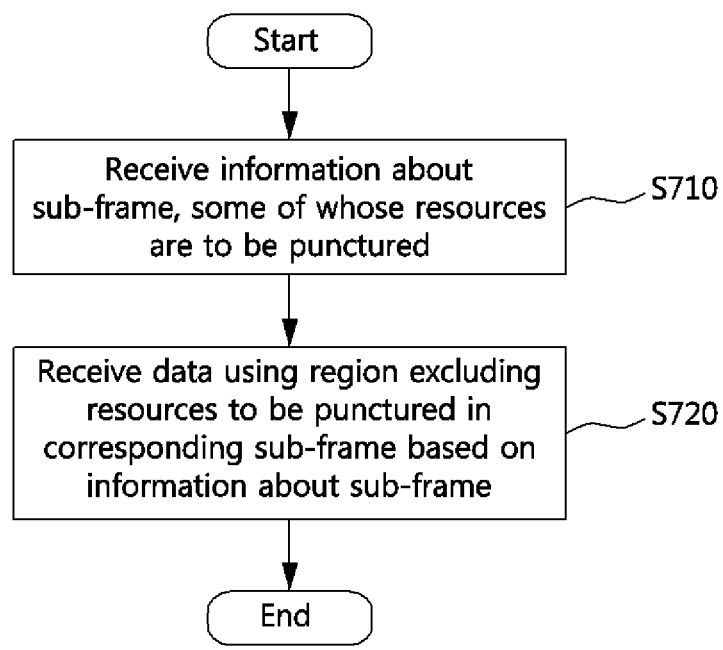
FIG. 7 is a flowchart for explaining an example of an ICIC method of user equipment according to an embodiment of the present invention.

FIG. 7 is a flowchart for explaining an ICIC method of UE according an embodiment of the present invention.

Referring to FIG. 7, an ICIC method of UE according an embodiment of the present invention may include step S710 of receiving information about a sub-frame, some of whose resources are to be punctured, and step S720 of receiving data using a region excluding the resources to be punctured in a corresponding sub-frame based on the information about the sub-frame.

In step S710, the UE receives information about the sub-frames whose resources are punctured, transmitted by the eNB in step S310 described with reference to FIG. 3. That is, in step S710, the UE receives information about the sub-frames, some of whose resources are punctured from the eNB.

The meaning of the information about the sub-frames whose resources are punctured received from the eNB has been described above, and thus the redundant description will not be repeated.

A method of receiving the information about the sub-frames whose resources are punctured from the eNB (PRC signaling, PDCCH or SI broadcasting) has been described above in the process of describing the method of transmitting the information from the eNB to the UE, and thus the redundant description will not be repeated.

In step S720, data is received using a region excluding the resources to be punctured in a corresponding sub-frame based on the information about the sub-frame.

That is, through step S710, since the UE has received the information about the sub-frame, some of whose resources are to be punctured (information about locations of resources to be punctured has been also received when locations of resources to be punctured are set to be specific to the UE), the UE performs a decoding operation while considering that some resources have been punctured in the process of decoding the PDSCH included in the received sub-frames.

While the example embodiments of the present invention and their advantages have been described in detail, it should be understood that various changes, substitutions and alterations may be made herein without departing from the scope of the invention.

The invention claimed is:

1. A time-domain inter-cell interference control method of a base station in a heterogeneous network environment, comprising:
    transmitting information about sub-frames, some of whose resources are to be punctured, to user equipment (UE);
    puncturing the some resources of the corresponding sub-frame based on the information about the sub-frames and transmitting the sub-frame, some of whose resources are punctured, to the UE; and
    transmitting physical downlink shared channel (PDSCH) data to the UE only when the some resources of the corresponding sub-frame are not punctured,
    wherein, when the sub-frames, some of whose resources are punctured, are set to be specific to a cell managed by the base station, the information about the sub-frames is transmitted to the UE using system information (SI) broadcast by the base station.

2. The method of claim 1, wherein the some resources include resources through which the base station transmits a cell-specific reference signal (CRS).

3. The method of claim 1, wherein the information about the sub-frames further includes information about some resources to be punctured in the sub-frame.

4. The method of claim 1, wherein the sub-frames, some of whose resources are punctured, are set to be specific to the UE.

5. The method of claim 4, wherein, when the sub-frames, some of whose resources are punctured, are set to be specific to the UE, the information about the sub-frames is transmitted to the UE using radio resource signal (RRC) signaling from the base station to the UE or a physical downlink control channel (PDCCH) for the UE.

6. A time-domain inter-cell interference control method of a base station in a heterogeneous network environment, comprising:
- setting system information (SI) transmission resources;
- transmitting SI using only the SI transmission resources or preferentially using the SI transmission resources when SI is transmitted using a sub-frame designated as an almost blank sub-frame (ABS); and
- transmitting physical downlink shared channel (PDSCH) data to user equipment (UE) only when the SI transmission resources are not being used,
- wherein, when the sub-frame, some of whose resources are punctured, are set to be specific to the cell managed by the base station, information about the sub-frame is transmitted to the UE using SI broadcast by the base station.

7. The method of claim 6, wherein the SI transmission resources are used to transmit at least one of a cell-specific reference signal (CRS), a primary synchronization signal (PSS), a secondary synchronization signal (SSS), a physical broadcast channel (PBCH), a SI block (SIB1), and a paging message.

8. The method of claim 6, wherein the SI transmission resources include at least one of a time, a frequency, a code, and a sequence.

9. The method of claim 6, wherein, in setting the SI transmission resources, the base station directly sets its SI transmission resources or is configured to receive the setting from an operation & management (O&M) server.

10. The method of claim 6, further comprising informing, at the base station, the SI transmission resources set in setting the SI transmission resources directly to an adjacent cell or to an adjacent cell through an operation & management (O&M) server or a mobility management entity (MME).

11. A time-domain inter-cell interference control method of user equipment (UE) in a heterogeneous network environment, comprising:
- receiving information about sub-frames, some of whose resources are to be punctured; and
- receiving data using a region excluding the resources to be punctured in a corresponding sub-frame based on the information about the sub-frames,
- wherein, when the sub-frames, some of whose resources are punctured, are set to be specific to a cell to which the UE belongs, the information about the sub-frames, is received using system information (SI) broadcast by the base station.

12. The method of claim 11, wherein the some resources include resources through which at least one base station transmits a cell-specific reference signal (CRS).

13. The method of claim 11, wherein the information about the sub-frames further includes information about some resources to be punctured in the sub-frame.

\* \* \* \* \*